W. L. MILLER.
POWER OPERATED CHUCK.
APPLICATION FILED MAY 15, 1912.
1,074,280.
Patented Sept. 30, 1913.
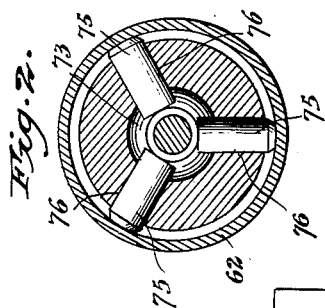
Witnesses:
L. S. Mann,
S. N. Pond
Inventor;
William L. Miller,
By Offield, Towle, Graves & Offield,
Attys.

UNITED STATES PATENT OFFICE.

WILLIAM L. MILLER, OF MADISON, WISCONSIN, ASSIGNOR TO GISHOLT MACHINE COMPANY, OF MADISON, WISCONSIN, A CORPORATION OF WISCONSIN.

POWER-OPERATED CHUCK.

1,074,280.      Specification of Letters Patent.      Patented Sept. 30, 1913.

Application filed May 15, 1912. Serial No. 697,398.

*To all whom it may concern:*

Be it known that I, WILLIAM L. MILLER, a citizen of the United States, residing at Madison, in the county of Dane and State of Wisconsin, have invented certain new and useful Improvements in Power-Operated Chucks, of which the following is a specification.

This invention relates to power-operated chucks for lathes, screw-machines, and all similar machines employing chucks, and has reference more particularly to that type of power-operated chuck wherein the chucking devices are actuated in either or both directions by fluid pressure acting upon a piston contained within a cylinder.

In most fluid pressure operated chucks, so far as I am aware, the cylinder and piston are mounted upon and rotate with the spindle, and employ a stationary valve for admitting motive fluid to one or both sides of the piston.

One object of my invention is to dispense with this rotary motor, and employ a non-rotary cylinder and piston in connection with a movable valve for admitting and exhausting the motive fluid.

Another object of the invention is to provide a construction which shall substantially eliminate the end thrust upon the thrust bearings of the spindle so far as the action of the chuck-actuating mechanism is concerned.

A still further object of the invention is to provide a new and improved structure of chuck especially adapted to support hollow work, such as a piston casting.

The invention, its mode of operation, and its advantages will all be readily understood when considered in connection with the accompanying drawing illustrating one practical embodiment thereof, in which—

Figure 1 is an axial horizontal section, broken out between its ends, through a power-operated chuck embodying my invention; and Figs. 2 and 3 are cross-sectional details, enlarged on the lines 2—2 and 3—3, respectively, of Fig. 1.

Referring to the drawings, 5 designates a portion of the headstock frame of a lathe or like machine, and 6 and 7 the outer and inner bearings in which is journaled a hollow spindle 8, to the inner end of which is secured the chuck-head 9. The spindle 8 is provided, between the bearings 6 and 7, with suitable driving gear (not shown); and secured to the outer end of the spindle 8 is a bushing 10 which forms a bearing for the outer end portion of a chuck-actuating member, here shown as a tube 11, that extends through the spindle 8 coaxially with the latter; said tube being threaded at its inner end into a bearing sleeve 11ᵃ that fits the bore of the chuck-head 9.

Supported on the outer end of the frame 5 by a series of studs 12, and coaxially disposed relatively to spindle 8 and tube 11, is a cylinder comprising inner and outer cylinder heads 13 and 14, respectively, and an intermediate cylindrical wall 15 that is conveniently cast integral with the inner cylinder head 13; the outer cylinder head 14 being secured thereto as by screws 16. The cylinder is mounted on the studs 12 with capacity for a slight end motion, for a purpose hereinafter disclosed. Within the cylinder is a piston 17 provided in its periphery with suitable packing 18; said piston having a hub portion 19 slidably engaging inwardly extending flanges 20 and 21 formed on the cylinder-heads 13 and 14, respectively, and equipped with suitable packing 22 and 23. The cylinder heads 13 and 14 are formed with ducts 24 and 25, respectively, leading to opposite sides of the piston from a valve-chest 26, in which latter is slidably mounted a longitudinally movable valve 27. A supply pipe 28 for the motive fluid enters the valve chest 26 centrally thereof. The slidable valve 27 is hollow, and is interiorly divided into an intermediate supply chamber 29 and end exhaust chambers 30 and 31. The supply chamber 29 has two series of radial ports 32 and 33, the exhaust chamber 30 has a series of radial ports 34 and an end port 35, and the exhaust chamber 31 has two series of radial ports 36 and 37. In the position of the valve shown, motive fluid is introduced to the left side of the piston through ports 33, chamber 29, ports 32 and duct 25; while motive fluid is exhausting from the opposite or right side of the piston through duct 24, ports 36, chamber 31 and ports 37. In the reversed position of the valve, motive fluid is supplied to the right-hand side of the piston through ports 32, chamber 29, ports 33, and duct 24, while the motive fluid on the opposite or left side of the piston is exhausted through duct 25, ports 34, chamber 30, and end port 35.

Keyed on the tube 11 and lying within the hub 19 of the piston is a collar 38; and on the threaded outer end of the tube 11 are a pair of adjusting nuts 39 and 40. Surrounding that portion of the tube 11 lying between the collar 38 and the nut 39 is an anti-friction bearing comprising race-ways 41 and 42 and interposed balls 43. The hub 19 of the piston is formed with an internal annular flange 44 radially opposite the collar 38 and just inwardly of the inner raceway 41; and the outer end of the piston hub 19 is internally threaded and receives adjusting nuts 45 and 46. The adjusting nuts 39 and 40 are so set that normally the space between the inner nut 39 and the collar 38 slightly exceeds the full width of the anti-friction bearing; and the same is true of the adjusting nuts 45 and 46 relatively to the flange 44 and the anti-friction bearing, all for a purpose hereinafter explained.

The inner end wall 13 of the cylinder is formed with a hub-like extension 47 having an external annular flange 48 that is mounted on the studs 12. Secured to the outer face of the flange 48 by screws 49 is a keeper ring 50, the inner periphery of which extends some distance inwardly of the bore of the hub extension 47 forming an annular shoulder 51. The bushing 10 that is threaded into the outer end of the spindle 8 is of less diameter than the latter, thereby forming at the end of the spindle an annular shoulder 52 lying in substantially the same transverse plane as the annular shoulder 51. Screwed on to the outer end of the bushing 10 is a ring 53, the inner face of which forms an annular shoulder 54; and at the inner end of the bore of the hub extension 47 is a fourth annular shoulder 55. Between the bushing 10 and the hub extension 47, and confined endwise between the shoulders 51, 52 and the shoulders 54, 55 is another anti-friction bearing comprising race-ways 56 and 57, and interposed balls 58. The space between the shoulders 51 and 55 is slightly greater than the total width of the bearing; and the same is true of the space between the shoulders 52 and 54.

59 and 60 designate the end thrust bearings of the spindle, located at opposite ends of the horizontal bearing 7.

In the position of the parts shown, motive fluid admitted to the left side of the piston has forced the latter to the right. The piston thrust acts through the piston hub 19, rings 45 and 46, the anti-friction bearing 42, 43, 41, and collar 38, to force inwardly the tube 11, thereby actuating the chucking devices at the opposite end of the tube; while the re-action against the outer end wall 14 of the cylinder through the cylinder wall 15, inner end wall 13, hub extension 47, shoulder 51, anti-friction bearing 56, 58, 57, shoulder 54, ring 53, bushing 10, upon the spindle 8, tending to thrust the latter outwardly. When the valve 27 is reversed, the motive fluid acts upon the right side of the piston, and the thrust of the piston is then through the flange 44, anti-friction bearing 41, 43, 42, and nuts 39 and 40, upon the tube 11, forcing the latter outwardly or in a direction to release the chucking devices. The re-action against the inner end wall 13 of the cylinder is exerted through the shoulder 55, anti-friction bearing 57, 58, 56, and shoulder 52 of the spindle, forcing the latter inwardly. During the inward thrust upon the chuck-actuating tube 11, the race-way 42 tends to remain stationary with the piston hub 19 by reason of its frictional engagement with nut 45, and the race-way 41 tends to turn by reason of its frictional engagement with the collar 38; also the race-way 56 remains stationary by reason of its frictional engagement with the shoulder 51, and the race-way 57 tends to turn by reason of its frictional engagement with the ring 53. Conversely, when the chuck-actuating tube 11 is forced outwardly, the race-ways 41 and 57 tend to remain stationary, and the race-ways 42 and 56 tend to turn with the spindle 8 and tube 11. By reason of the fact that the cylinder is not rigidly secured to the headstock frame, but is so mounted as to be capable of a slight endwise play relatively to the headstock frame, the outward and inward thrust upon the tube 11 counter-acts the simultaneous inward and outward thrust upon the spindle 8 thus relieving the thrust-bearings 59 and 60 of the spindle of end thrust resulting from the action of the chuck-actuating mechanism.

In connection with the chuck-head and chuck-actuating tube 11, I have shown a novel chucking mechanism well adapted to support a hollow structure, such as an engine piston, while the same is being turned; although it is to be understood that the fluid-pressure operated mechanism for actuating the chuck may be employed with any other chucking mechanism, including many of the various types now in common use.

Secured to the front face of the chuck-head 9 is a hollow mandrel 61 on which is adapted to be supported any hollow casting, such as the engine piston shown at 62. Keyed within the inner end of the tube 11 is a wedge-block 63. One inclined face 64 of said wedge-block engages the inclined inner end 65 of a tube 66 that lies within and longitudinally of the mandrel 61; said tube 66 being normally urged outwardly by a spring 67. Lying within and coaxial with the tube 66 is a rod 68 having an inclined inner end 69 engaged by the other inclined face 70 of the wedge-block 63. The rod 68 is normally urged inwardly or toward the wedge-block by a spring 71; and the reduced outer end portion of the rod 68 extends through the outer end of the tube 66 and the bore of the outer end of the mandrel 61, and terminates in an inclined outer end 72. The outer end of the tube 66 is beveled, as shown at 73, and engages the oblique inner ends 74 of a series of radially disposed pins 75 slidably mounted in suitable radial holes 76 in the mandrel 61. The outer inclined end 72 of the rod 68 engages the inclined inner end 77 of a similar radial pin 78 slidably mounted in a radial hole 79 in the outer end of the mandrel 61. The outer end of said mandrel is further provided, on its upper side, with a pair of serrated horns 80 (Fig. 3); and the tube 66 and rod 68 are held against rotary movement relatively to each other and to the mandrel 61 by a key 81 extending through a slot 82 in the tube 66 and into a groove 83 in the rod 68.

It will be evident from the foregoing that when a piece of work, such as the piston casting 62, is chucked over the mandrel 61, the inward movement of the wedge-block 63 by the power-operated mechanism hereinabove described, forces the radial pins 75 and 79 outwardly into holding engagement with the inner wall of the work 62, the outward movement of the pin 78 at the same time forcing the work into holding engagement with the horns 80 of the mandrel, so that the work is securely supported on the chuck mandrel. Upon the return movement of the tube 11, the wedge-block 63 is retracted, and the springs 67 and 71 operate to release the grip of the pins and horns upon the work, allowing the latter to be readily withdrawn from the chuck mandrel.

Where other forms of chucking devices are employed, the jaw-actuating members will, of course, be so connected with the tube 11 as to be actuated in their jaw-closing and opening movements by the opposite movements of the chuck-actuating member 11.

I claim—

1. In a power-operated chuck, the combination with a headstock frame, and a hollow spindle mounted therein, of chucking mechanism carried thereby, an endwise movable chuck-actuating member within said spindle, a non-rotary cylinder arranged coaxially with said spindle, a piston in said cylinder, and a thrust connection between said piston and said chuck-actuating member.

2. In a power-operated chuck, the combination with a headstock frame, and a hollow spindle mounted therein, of chucking mechanism carried thereby, an endwise movable chuck-actuating member within said spindle, a non-rotary double-acting cylinder arranged coaxially with said spindle, a piston in said cylinder, and oppositely acting thrust connections between said piston and said chuck-actuating member.

3. In a power-operated chuck, the combination with a headstock frame, and a hollow spindle mounted therein, of chucking mechanism mounted on one end of said spindle, a non-rotary cylinder arranged coaxially with the said spindle and supported on said headstock frame, an endwise movable chuck-actuating member within said spindle, a piston in said cylinder, and a thrust connection, including an anti-friction bearing, between said piston and said chuck-actuating member.

4. In a power-operated chuck, the combination with a headstock frame, and a hollow spindle mounted therein, of chucking mechanism mounted on one end of said spindle, a non-rotary cylinder arranged coaxially with said spindle and supported on said headstock frame with capacity for endwise movement relatively to the latter, an endwise movable chuck-actuating member within said spindle, a piston in said cylinder, a thrust connection, including an anti-friction bearing, between said piston and said chuck-actuating member, and a thrust connection including an anti-friction bearing, between said cylinder and said spindle.

5. In a power-operated chuck, the combination with a headstock frame, and a hollow spindle mounted therein, of chucking mechanism mounted on one end of said spindle, a non-rotary double acting cylinder arranged coaxially with said spindle and supported on said headstock frame with capacity for endwise movement relatively to the latter, and endwise movable chuck-actuating member within said spindle, a piston in said cylinder, oppositely acting thrust connections, including an anti-friction bearing between said piston and said chuck-actuating member, and oppositely acting thrust connections, including an anti-friction bearing, between said cylinder and said spindle.

6. The combination with a head-stock frame, and a hollow spindle mounted therein, of a chuck-head secured to one end of said spindle, a cored mandrel secured to the face of said chuck-head, radially disposed pins slidably mounted in said mandrel, endwise movable means within said mandrel for actuating said pins outwardly, spring means within said mandrel for retracting said pin-actuating means, and an endwise movable member within said hollow spindle adapted to engage and actuate said pin-actuating means throughout the working movement of the latter.

WILLIAM L. MILLER.

Witnesses:
 SAMUEL N. POND,
 EDMUND G. INGERSOLL.